(12) United States Patent
Barker

(10) Patent No.: US 9,782,711 B2
(45) Date of Patent: Oct. 10, 2017

(54) SYSTEM AND METHOD FOR AUTOMATIC CONTROL OF DIFFERENTIAL PRESSURE IN A BAGHOUSE SYSTEM

(71) Applicant: Covanta Energy, LLC, Morristown, NJ (US)

(72) Inventor: Robert Barker, Hockessin, DE (US)

(73) Assignee: COVANTA ENERGY, LLC, Morristown, NJ (US)

(*) Notice: Subject to any disclaimer, the term of this patent is extended or adjusted under 35 U.S.C. 154(b) by 137 days.

(21) Appl. No.: 14/601,613

(22) Filed: Jan. 21, 2015

(65) Prior Publication Data

US 2015/0202558 A1    Jul. 23, 2015

Related U.S. Application Data

(60) Provisional application No. 61/929,586, filed on Jan. 21, 2014.

(51) Int. Cl.
*B01D 46/00* (2006.01)
*B01D 46/02* (2006.01)
(Continued)

(52) U.S. Cl.
CPC ....... *B01D 46/0064* (2013.01); *B01D 46/002* (2013.01); *B01D 46/0019* (2013.01);
(Continued)

(58) Field of Classification Search
CPC  B01D 46/00; B01D 46/0064; B01D 46/0019; B01D 46/002; B01D 46/0068;
(Continued)

(56) References Cited

U.S. PATENT DOCUMENTS 4,277,255 A † 7/1981 Apelgren
5,837,017 A * 11/1998 Santschi ............ B01D 46/0068
55/302
(Continued)

FOREIGN PATENT DOCUMENTS

DE    2709204    9/1978
DE    3341786    6/1985
(Continued)

OTHER PUBLICATIONS

International Search Report dated May 26, 2015 in related PCT application No. PCT/US2015/012173.

*Primary Examiner* — T. Bennett McKenzie
(74) *Attorney, Agent, or Firm* — Hogan Lovells US LLP

(57) ABSTRACT

Systems and methods for automatic control of a baghouse fabric filter system as a single unit to maintain a consistent pressure drop are disclosed. The fabric filter system may be a pulse jet cleaning system, and a controller may be provided to receive inputs from pressure sensors and other components and to control activation of pulse pipes for cleaning filter bags. The controller may adjust parameters including the dwell time between pulses, the duration of each pulse, and the pulse air pressure. The controller may further optimize these parameters to provide the minimum cleaning necessary per pulse to achieve the consistent differential pressure. By continuously adjusting the parameters, the system maintains the maximum amount of filter cake on the bags to promote optimal emissions control performance.

15 Claims, 4 Drawing Sheets

(51) Int. Cl.
  *B01D 46/44* (2006.01)
  *B01D 46/04* (2006.01)
  *B01D 46/10* (2006.01)

(52) U.S. Cl.
  CPC ....... *B01D 46/0068* (2013.01); *B01D 46/023* (2013.01); *B01D 46/04* (2013.01); *B01D 46/10* (2013.01); *B01D 46/446* (2013.01)

(58) Field of Classification Search
  CPC ...... B01D 46/023; B01D 46/04; B01D 46/10; B01D 46/446
  USPC ...................................................... 95/19–22
  See application file for complete search history.

(56) References Cited

U.S. PATENT DOCUMENTS

| | | | |
|---|---|---|---|
| 6,077,490 A | 6/2000 | McIlroy et al. | |
| 6,270,732 B1 * | 8/2001 | Gardner ............. | B01D 46/0068 422/171 |
| 2013/0255485 A1 | 10/2013 | Appelo et al. | |

FOREIGN PATENT DOCUMENTS

| | | |
|---|---|---|
| EP | 0796645 | 9/1997 |
| EP | 2602016 | 6/2013 |
| WO | 2007/041955 | 4/2007 |

\* cited by examiner
† cited by third party

SYSTEM AND METHOD FOR AUTOMATIC CONTROL OF DIFFERENTIAL PRESSURE IN A BAGHOUSE SYSTEM

CROSS-REFERENCE TO RELATED APPLICATIONS

This application claims priority to U.S. Provisional Patent Application No. 61/929,586, filed on Jan. 21, 2014, which is hereby incorporated by reference in its entirety.

TECHNICAL FIELD

The present invention is directed to emissions control using baghouse filter systems, and more particularly to automatic control of the baghouse filter system as a single unit to maintain a consistent pressure drop.

BACKGROUND OF THE INVENTION

Fabric filter systems, also known as baghouses, are air pollution control devices that remove the particulates out of air or gas released from industrial plants, including power plants, steel mills, cement plants, chemical plants, mining operations, and food processing plants. Typical fabric filter systems are made up of one or more cells, wherein each cell includes a plurality of rows of bags that act as a filter medium. Particulate-laden gas or air enters the fabric filter and is drawn through the bags, either on the inside or the outside depending on the cleaning method, and accumulates to form a layer of dust known as filter cake. The filter cake itself acts as filtering element, with the particles making up the filter cake capturing incoming fine particles and adsorbing gas phase impurities that would otherwise not be caught by the bags themselves.

As the filter cake builds on the bag, it becomes more difficult for air to move through the bag, causing a pressure drop (or differential pressure) and a reduction in the ability of the bag to continue filtering particulates. Therefore, many systems monitor the pressure drop across the fabric filter and institute a periodical cleaning process each time the pressure drop reaches a certain level. The fabric filters themselves are often classified based on the cleaning method used, with the most common being mechanical shakers, reverse air, and pulse jet.

Mechanical shakers use shake cycles of vibrations to create waves in the bags, thereby removing the filter cake layer. However, during the shake cycle, there can be no positive pressure and therefore the bag or compartment of bags must be taken offline and isolated from the input air streams during cleaning.

In reverse air fabric filters, dirty air flow normally enters the fabric filter and passes through the bag from the inside causing filter cake to build up on the inside. Bags are cleaned by flowing clean air through the bag in a reverse direction as compared to the normal air flow. This reverse air flow pressurizes the bag, making the bags partially collapse and causing the filter cake to break apart and drop out of the bag. When the cleaning is complete, the reverse air flow is discontinued and normal input air flow is reintroduced into the bag. As with mechanical shaking, this process also requires that the bag or compartment of bags be taken offline and isolated from the input air.

Finally, in pulse-jet fabric filters, pulses of high pressure air are sent down the inside of the bag to remove the filter cake which accumulates on the outside of the bag. Typical pulse-jet fabric filter cleaning systems use fixed dwell pulse control timing boards to sequentially control the cleaning of fabric filter bags. Each cell in the fabric filter system is capable of being brought online/offline separately from the other cells. Traditionally, pulse-jet cleaning systems perform offline cleaning in a cycle wherein each cell is periodically isolated and pulsed down thoroughly. During the offline cleaning, overall differential pressure across the entire fabric filter is elevated while any cell is isolated, and when a cell is returned to service the filter cake layer on the surface of all bags in the cell is much thinner than the average or normal thickness. These systems completely clean one cell before moving on to the next, utilizing a fixed width dwell time between pulses and a fixed width pulse time. The dwell time width and pulse time width settings may be adjusted, such as by using a variable resistor in an RC circuit built into a pulse timing board. Typically, these settings are based on worst case filter cleaning demand, wherein the fixed settings are determined based on an assumption that the maximum amount of filter cake has been deposited on each cell within a certain period of time. This approach initiates cleaning as an on/off function of the sensed fabric filter differential pressure. These traditional pulse-jet cleaning systems use either a differential pressure switch or a value from a differential pressure transmitter to behave as a switch, turning the cleaning on and off when the differential pressure reaches high and low set points. When the differential pressure hits the high set point, cleaning is activated. During cleaning, the differential pressure falls and eventually reaches the low set point at which time the cleaning cycle is deactivated. Typically, there is some deadband value between the "on" and "off" commands, such that the cleaning cycle remains off until the pressure builds back to the high set point.

The traditional approach of taking individual cells of bags offline to perform cleaning leads to several problems. For example, the cleaned bags receive significantly more input air and gases as compared to cells of bags which were not recently cleaned because the input flow naturally diverts to bags with less filter cake providing less resistance to gas flow, causing unequal distribution of the input air and gases within the fabric filter. As noted above, traditional cleaning methods using fixed dwell times and pulse times may also remove too much of the filter cake, leaving a layer that is too thin to trap fine particulates. Instead, it is now seen as advantageous to have a system allowing online cleaning without taking cells out of service. In order to achieve online cleaning, the pulses must create sufficient air pressure within the bag to overcome the inflow of air and gas through the bag. However, existing systems implementing online cleaning still clean only one cell at a time, and still rely on sensed high and low pressure drop points to turn the pulse jets on and off. These lead to inconsistent differential pressure within the system, insufficient layers of remaining filter cake to trap fine particulates, and unequal distribution of inflow air and gas within the fabric filter.

What is needed is a system and method for continuous online cleaning with flexible cleaning sequences to distribute cleaning across the fabric filter, and to manage the cleaning sequences based on actual loading to maintain a consistent differential pressure, improving filtration.

SUMMARY

The present application is directed to a system and method to improve the consistency of differential pressure and the efficiency of particulate removal from exhaust gases by controlling pulse jets in a fabric filter system. The system and method automatically controls several key parameters associated with the pulse jets to maintain a consistent fabric filter differential pressure set point, rather than activating pulse jets when the differential pressure reaches a predetermined high value and deactivating the pulse jets when the differential pressure returns to a predetermined low value. These parameters include the dwell time between pulses, the duration of each pulse, and the pulse air pressure. The controller may further optimize these parameters to provide the minimum cleaning necessary per pulse to achieve the consistent differential pressure. By continuously adjusting the parameters, the system maintains the maximum amount of filter cake on the bags to promote optimal emissions control performance.

The automatic pulse jet system and method may use a central controller that operates multi-dimensional pulse jet arrays to permit a flexible choice of cleaning sequences, thereby distributing the cleaning across the fabric filter while maintaining a consistent differential pressure. The pulse jet system may include a plurality of pulse pipes and valves located in a plurality of locations along the bags in each cell. The pulse pipes and valves may be connected to a plurality of headers, with one or more headers provided for each cell. In addition, the headers for each cell may be joined together to create a single, continuous header for continuous online cleaning.

The flexible sequences instituted by the controller may include sequences that fire multiple pulse pipes simultaneously in different cells, or one pulse pipe per step with the flexibility for sequence selection and modification without wiring changes. Each step in the cleaning sequence corresponds to the opening of a single valve or multiple valves at a given time. In each step, one or more valves are opened to supply air pressure to one or more pulse pipes, and the pulse pipes then clean the bags by directing pulses of air into the bags. When multiple pipes are activated at the same time, a greater quantity of air is needed in the air supply of the system. The number of steps necessary to clean the fabric filter system will depend on the number of cells, the number of rows of bags in each cell, and the number of rows that are cleaned each time valves are opened. The cleaning sequences are repetitive, such that when the last step in the sequence is completed the process begins again with the first step in the cleaning sequence. For example, if a fabric filter has 6 cells and 15 rows of bags in each cell, a sequence which individually activates one pulse pipe per cleaning step would include 90 steps. In such a sequence, when step 90 is completed the sequence would start over again with step 1. Since a fabric filter system may have a hundred or more individual pulse pipes, the controller's output IO modules may be located in the vicinity of the pulse pipes to minimize installation costs both for new systems and retrofits. Control of the pulse sequences may include a plurality of programmable parameters, including but not limited to, pulse dwell time, pulse air pressure, pulse width, and the order of activation of each pulse pipe. The system and method may also change between sequences in real time, depending on sensed conditions within the fabric filter system or changed desires of the operator.

DETAILED DESCRIPTION

A system and method for providing an improved online cleaning process in a pulse jet fabric filter system are disclosed. The system uses a controller that activates various pulse pipes within fabric filter cells, and that adjusts a plurality of parameters associated with the emitted air pulses and sequences of operation of the pulse pipes in order to maintain a consistent differential pressure within the system while maintaining the maximum amount of filter cake on the bags.

Figure 1:
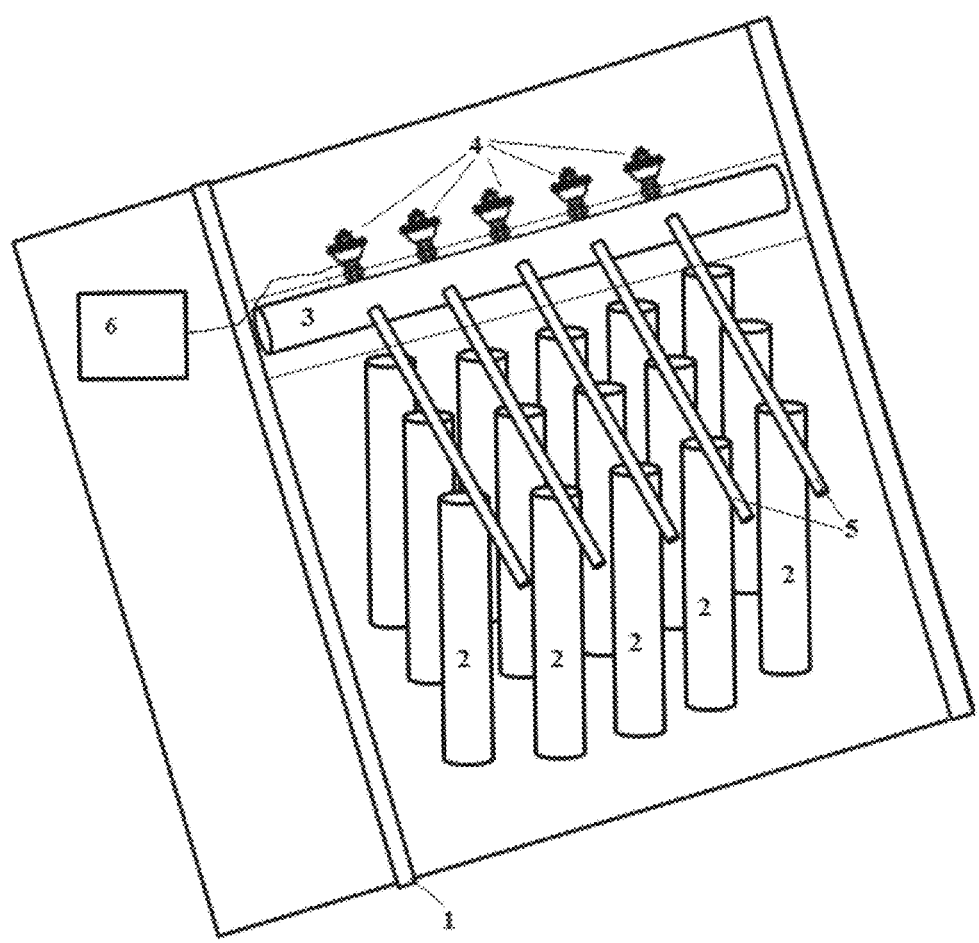
FIG. 1 is an illustration of a pulse jet baghouse system according to the present invention.

As shown in FIG. 1, a fabric filter system may include a housing 1, a plurality of fabric filter bags 2, a compressed air manifold header 3, valves 4 to control air flow from the air manifold 3, pulse pipes 5 configured to direct air into the fabric filters, and a controller 6 configured to activate the valves 4 and direct air into the various pulse pipes 5. The plurality of bags 2 may be arranged in cells, with a plurality of rows of bags in each cell. Each pulse pipe may extend across one row of the bags, with the pulse pipes including openings above each bag. Typical bags used in fabric filters have a diameter of around 6", although bags up to 10-12" in diameter have also been used. The dimensions of the bags may be adjusted according to the specific system or industry in which they are used. Each cell of fabric filters may have a corresponding compressed air manifold header 3. The valves 4 may be solenoid valves, and the controller may activate and deactivate the solenoid valves by sending control signals to outputs located at the valves. Typically, a large diameter pipe acts as a header for each cell. The pulse pipes within the cell then connect to the header.

In order to clean during online operation, the air pulses must overcome forward gas and air flow through each bag due to normal operation of the filtering system, and must provide enough additional local velocity to drive excess filter cake off the bag. In order to provide sufficient volume and velocity of the air passing through each bag during a pulse, the size of the pulse pipes and pulse valves are configured according to the type and size of the system, as well as the environment or industry the filtration system is being used in. For example, in a waste combustion system the size of the pulse pipes and valves may be around 1.5-3". The headers 3 supplying the pulse pipes 5 may be configured such that enough air is stored locally at the pulse valve to prevent pressure from dropping below the minimum required for an effective pulse while the pulse is in progress.

Figure 2A:
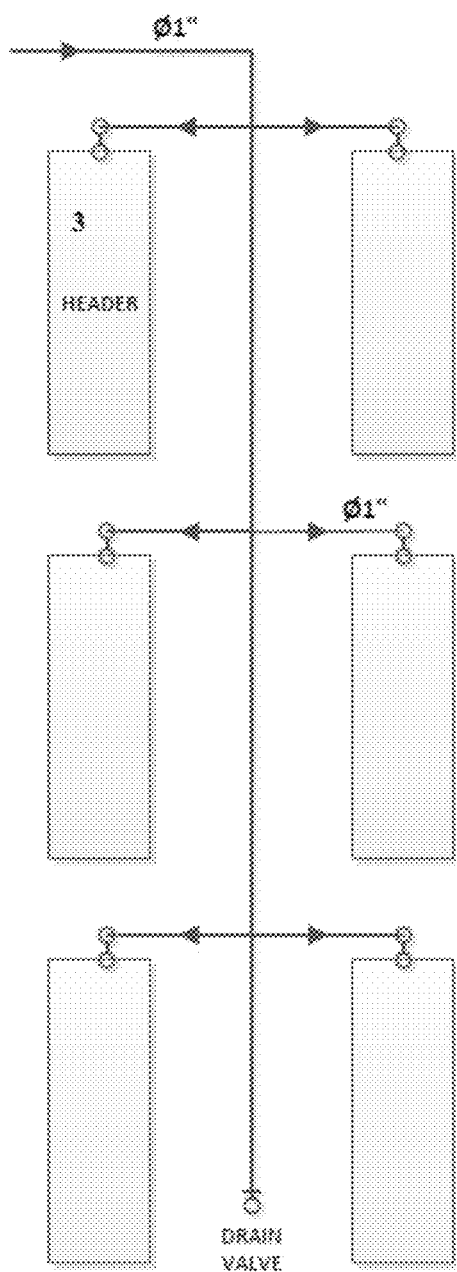
FIG. 2a is an illustration of the header configuration in prior art systems.
Figure 2B:
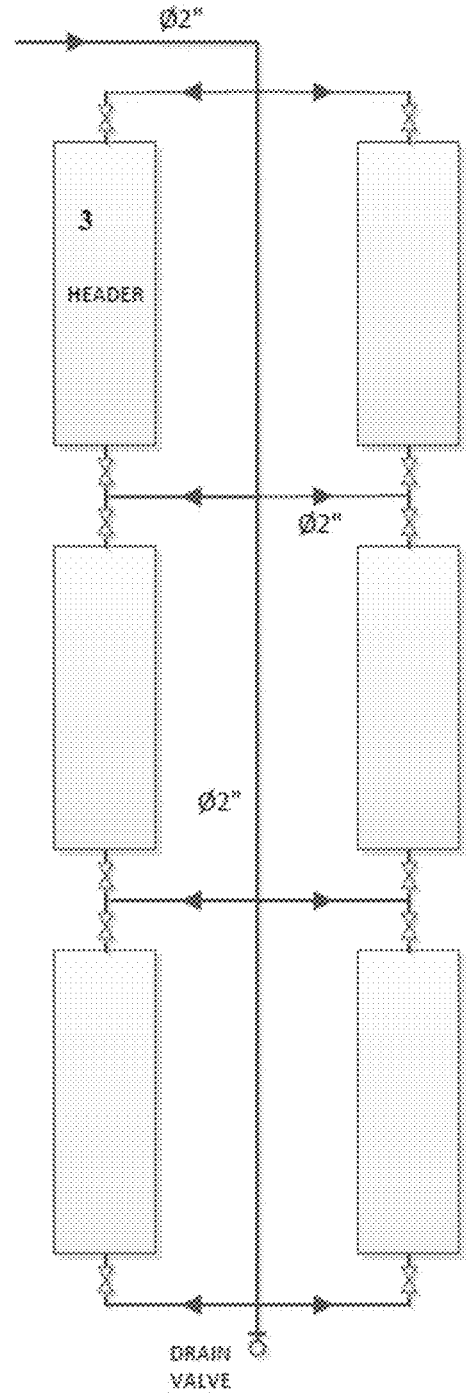
FIG. 2b is an illustration of a header configuration of the present invention.

As shown in FIG. 2a, prior art pulse jet cleaning systems typically have an individual header 3 for each cell of fabric filters. In contrast, the present invention allows for joining together the headers of each cell and piping them together as illustrated in FIG. 2b. This creates a larger continuous header, and allows the system to function as if it were a single header for continuous online cleaning. The continuous header has a larger overall air supply than the individual headers of the prior art systems. Therefore, when a pulse pipe is fired, it does not deplete the available air supply as much, and the system maintains air pressure in between pulses better allowing for more consistent air pressure during the pulsing operations.

Figure 3:
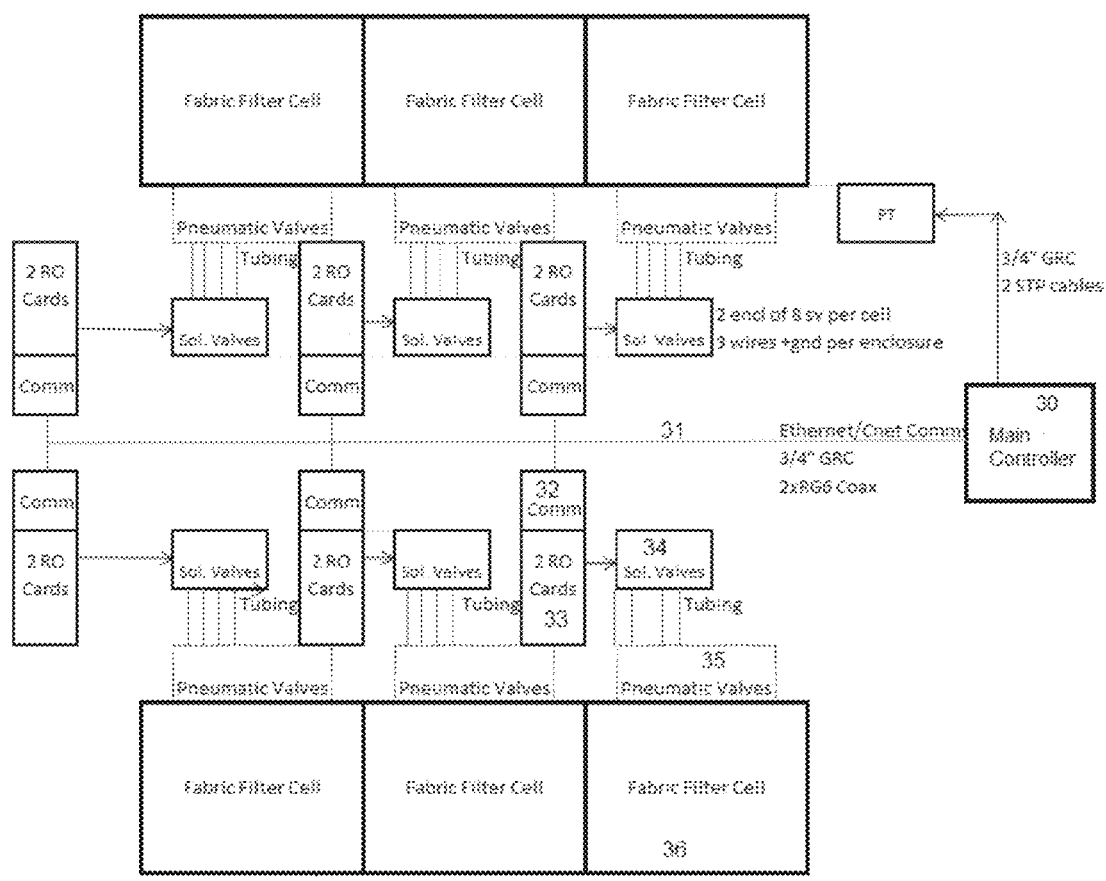
FIG. 3 is an illustration of the control system and connections to the fabric filter cells.
Figure 3:
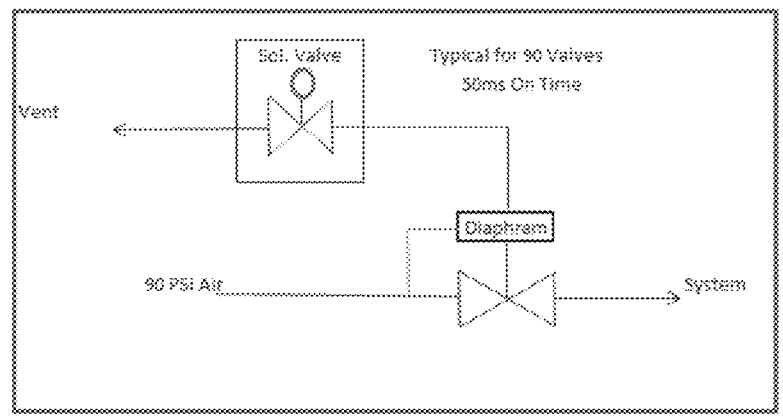

As shown in FIG. 3, a main controller 30 may be connected through a communication channel 31 to communication interfaces 32 at relay output (RO) cards 33 at each cell header. The communication channel 31 may be a wired or wireless communication channel. For example, the communication channel may be an Ethernet cable, fiber optic cable, coaxial cable, telephone line, or conducting wire. Commands from the controller 30 are sent along the communication channel 31 to the communication interface 32 at each cell header. The communication interface 32 passes the signals on to the RO cards, which then control the solenoid valves 34 in accordance with the received signals. Tubing may connect the solenoid valves 34 to pneumatic valves 35, which open into pulse pipes to direct air pulses into the fabric filters of each cell. The characteristics of the air pulses are determined by the control signals, including duration and intensity of the pulse. The air pulses then travel down the fabric filters in the opposite direction of the normal inflow air/gases received in the baghouse, and dislodge the built up filter cake from the exterior of the filter bags.

The main controller 30 may be located in any area within the baghouse, or may be housed in a separate area outside the baghouse. The relay output cards may be mounted in the vicinity of the pulse valves to reduce installation costs. Additionally, the relay output cards may be of a type configured to operate in extreme temperatures, such that the devices suited for the baghouse environment. Communication interfaces may link the main controller and relay output cards to an input/output (IO) panel rack, with the IP panel rack to operate IO devices including module dampers, limit switches, hand switches, and other devices that provide values to or receive values from the controller. The remotely located relay output cards, main controller and pulse control panel IO rack may communicate using Ethernet configured as a device level ring. A communications uplink connection, such as a fiber optic cable, may link inlet continuous emissions monitors (CEMs) to the main controller to provide plant control system networking and connection to data collection and/or human machine interfaces (HMIs). In some embodiments, a computer system may be used which provides an HMI to graphically represent the status of the system to an operator, and to provide a means for the operator to interact with the system for purposes of monitoring and control. CEMs may be provided at both the inlet and outlet, which are typically an inlet to a spray dryer absorber vessel and at the stack. By integrating the fabric filter control with the overall plant process controllers, operators would have the availability to adjust the target differential pressure set points, as opposed to current methods that require use of fixed-value set points. The controller includes programmable logic to permit a flexible choice of cleaning sequences in the multi-dimensional arrays of fabric filter cells, thereby allowing a distribution of the cleaning across the fabric filter. These various sequences may include firing multiple pulse pipes simultaneously in different cells, or firing one pulse pipe per step. The fabric filters may have a hundred or more individual pulse pipes, and therefore in some embodiments the controller's output IO modules may be located in the vicinity of the pulse pipes to minimize installation costs both for new systems and retrofits. Typically, input and output signals are converted to and from data values used in the controllers to signals which are wired to devices outside the controller. Many types of signals exist and the IO modules provided may depend on the specific types of physical devices to which they interface. As an example, an output module may be provided to drive a 120 v solenoid and an input module may be provided to read a 4-20 ma 24 vdc analog signal.

Figure 4:
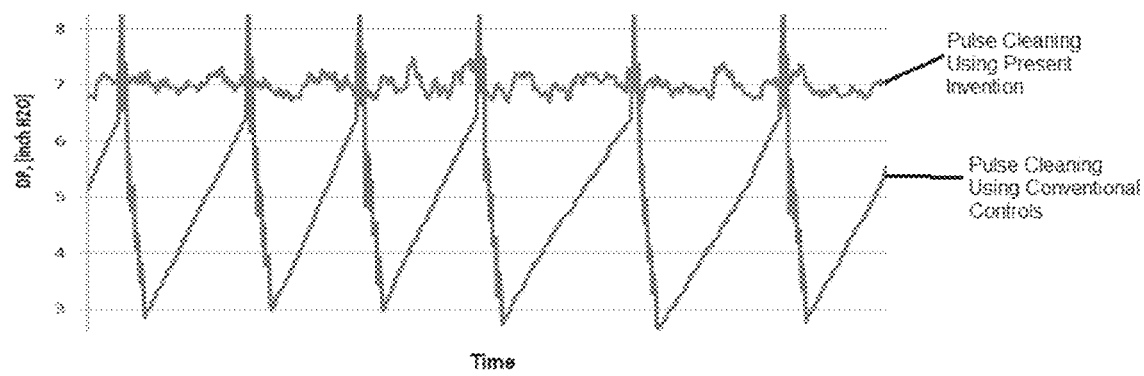
FIG. 4 is an illustration of the differential pressure in baghouse systems using conventional controls as compared to a system using the advanced controls described herein.

Control of the pulse sequences may include adjustment of one or more of a plurality of parameters, including dwell time, air receiver pressure, pulse valve on time or pulse width, and the order of activation of each pulse pipe. Set points of differential pressure may be established, and if a pressure sensor detects that the pressure has risen above or below a certain set point the controller may adjust parameters or begin activation of certain pulse pipes. The controller may further optimize these parameters to achieve the minimum cleaning necessary per pulse to achieve the consistent differential pressure, as seen in FIG. 4. By continuously adjusting the parameters, the system maintains the maximum amount of filter cake on the bags to promote optimal emissions control performance. As shown in FIG. 4, the differential pressure in a baghouse system using conventional controls varies between maximum and minimum set points, causing the system to be inefficient and to remove too much filter cake.

The controller may continuously adjust dwell time between pulses such that if the fabric filter differential pressure is tending to rise above set point, the dwell time is automatically reduced. Conversely, if the differential pressure is below set point, the controller may automatically increase dwell time as required. By automatically adjusting the dwell time as the differential pressure rises above or falls below set points, continuous online cleaning at a rate just fast enough to maintain a consistent overall differential pressure may be achieved.

As discussed above, the system includes an overall supply of compressed air available to the pulse system for use in pulsing the bags. This overall supply of air includes a local volume storage, also known as an air receiver vessel, that may include the volume of headers and piping close enough to the vicinity of a pulse valve to effect the characteristics of pulses resulting from the opening of the valve. The system may include an air compressor which feeds air into the air receiver vessels to keep the pressure at a consistent level. When headers require air, they take the air from the air receiver vessels. The controller may also monitor air receiver vessel pressure to assure adequate system recovery prior to initiating a pulse, and may control the air receiver vessel pressure setting such that the cleaning weight of each individual pulse can be managed as a cascade controller of the pulse dwell time control loop.

The controller may include program logic to automatically adjust the on-time of individual pulse valves, thereby adjusting the pulse width of the individual cleaning pulses. The normal pulse width for the system may be set depending on the mechanical properties of the pulse valves used. For example, the pulse valves may be pneumatically piloted pulse valves and the typical pulse width may be 100 ms. The pulse width may need to be adjusted over the life of a set of bags, and the controller may automatically make this adjustment based on measured properties of the bags or information on how long the bags have been in use.

The controller may also include the ability to dynamically select between cleaning sequences. This ability to dynamically select between sequences is not available in baghouse systems using older generation fixed timing boards. Dynamic adjustment of cleaning sequences may be beneficial in situations where it is found that gas loading favors one group of cells over another because of duct configuration, or where multiple pulse pipes are to be fired together in one set of operating conditions and severally in another. The tables below illustrate several cleaning sequences that may be implemented using the automatic controller of the present invention.

Although offline cleaning may be conducted, Online cleaning may be the normal cleaning mode of the system. Using the controller to control the various system components as described above, the system may distribute cleaning across the baghouse and within each cell, maintain a consistent overall differential pressure with only a minimal change to differential pressure from each cleaning pulse while operating continuously. As illustrated in the tables for sequences 2-10 below, a system may use 9 different online cleaning sequences. Sequence 2 represents an example of a default online sequence, and initially consists of 90 steps, pulsing 1 row and then waiting for a variable dwell time before pulsing the next row. When in online mode and actively cleaning, the dwell time between pulses will be continuously adjusted by the controller to achieve a target differential pressure, which is a function of both air flow and filter cake condition. The target differential pressure may be set at any initial desired value, such as 7 inwc.

Although an initial target differential pressure value may be set, during abnormal operating conditions the actual differential pressure may significantly increase or decrease such that the automatic control of pulse cleaning based on the set value would no longer be effective. For example, during abnormal unit operation causing significantly reduced air flow through the baghouse, the system may automatically change the target differential pressure for pulsing to reflect a constant filter cake condition. When the dwell time between pulses is relatively short, the width of each pulse (determined by the pulse valve on or open time) may be increased inversely proportional to the dwell such that each pulse delivers slightly more air and thus cleans each row for slightly more time than at longer pulse dwell times. Conversely, for longer pulse dwell times, the pulse width of each pulse may be reduced so as to reduce the amount of pulse air delivered by each pulsing valve.

Therefore, when the program logic for a current cleaning sequence is near the limits of operation, the controller may automatically adjust the pulse width in concert with adjustments to pulse dwell. Pulse air pressure adjustment may be automatically performed along with, or in lieu of, pulse width modulation to change the volume of air delivered with each pulse. This adjustment of pulse air pressure may also be done in concert with adjustment of pulse dwell. For example, if the pulse dwell time is relatively long due to an automatic adjustment for controlling overall differential pressure, the controller may automatically reduce the pressure maintained in the air receiver such that the pulse pipes deliver less air per pulse. Conversely, when pulse dwell time is short, the controller may increase the air receiver set pressure such that more air is delivered during each pulse. The pulse dwell and pulse air pressure adjustment enhances overall system stability and reduces the amount of adjustment required by the controller to maintain overall differential pressure. Examples of the order in which rows of the cells may be pulsed are for a plurality of sequences are shown in the tables below. The values in the shaded boxes are the step numbers during which the indicated row is cleaned.

| | Pulse Valves Sequence 2 | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 13 | 79 | 55 | 31 | 7 | 73 | 49 | 25 | 1 | 67 | 43 | 19 | 85 | 61 | 37 |
| Cell 2 | x | 10 | 34 | 58 | 82 | 16 | 40 | 64 | 88 | 22 | 46 | 70 | 4 | 28 | 52 | 76 |
| Cell 3 | x | 29 | 5 | 71 | 47 | 23 | 89 | 65 | 41 | 17 | 83 | 59 | 35 | 11 | 77 | 53 |
| Cell 4 | x | 42 | 18 | 84 | 60 | 36 | 12 | 78 | 54 | 30 | 6 | 72 | 48 | 24 | 90 | 66 |
| Cell 5 | x | 63 | 87 | 21 | 45 | 69 | 3 | 27 | 51 | 75 | 9 | 33 | 57 | 81 | 15 | 39 |
| Cell 6 | x | 68 | 44 | 20 | 86 | 62 | 38 | 14 | 80 | 56 | 32 | 8 | 74 | 50 | 26 | 2 |

In Sequence 2, Cell 1 Row 7 pulses first, then Cell 6 Row 1, then Cell 5 Row 10, etc. for a total of 90 steps.

Sequence 3 consists of 45 steps, pulsing 2 rows in each step.

| | Pulse Valves Sequence 3 | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 34 | 22 | 10 | 43 | 31 | 19 | 7 | 40 | 28 | 16 | 4 | 37 | 25 | 13 | 1 |
| Cell 2 | x | 20 | 8 | 41 | 29 | 17 | 5 | 38 | 26 | 14 | 2 | 35 | 23 | 11 | 44 | 32 |
| Cell 3 | x | 30 | 18 | 6 | 39 | 27 | 15 | 3 | 36 | 24 | 12 | 45 | 33 | 21 | 9 | 42 |
| Cell 4 | x | 3 | 15 | 27 | 39 | 6 | 18 | 30 | 42 | 9 | 21 | 33 | 45 | 12 | 24 | 36 |
| Cell 5 | x | 11 | 23 | 35 | 2 | 14 | 26 | 38 | 5 | 17 | 29 | 41 | 8 | 20 | 32 | 44 |
| Cell 6 | x | 43 | 10 | 22 | 34 | 1 | 13 | 25 | 37 | 4 | 16 | 28 | 40 | 7 | 19 | 31 |

For this sequence Cell 1 Row 1 and Cell 6 Row 11 both pulse on the first step. Cell 2 Row 6 and Cell 5 Row 12 during step 2, followed by Cell 4 Row 15 and Cell 3 Row 9.

| Pulse Valves Sequence 4 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 53.23 | 45.15 | 37.7 | 29.59 | 21.51 | 13.43 | 5.35 | 57.27 | 49.19 | 41.11 | 33.3 | 25.45 | 17.47 | 9.39 | 1.31 |
| Cell 2 | x | 30.60 | 22.52 | 14.44 | 6.36 | 58.28 | 50.20 | 42.12 | 34.4 | 26.56 | 18.48 | 10.40 | 2.32 | 54.24 | 46.16 | 38.8 |
| Cell 3 | x | 32 | 16 | 60 | 44 | 28 | 12 | 56 | 40 | 24 | 8 | 52 | 36 | 20 | 4 | 48 |
| Cell 4 | x | 51 | 35 | 19 | 3 | 47 | 31 | 15 | 59 | 43 | 27 | 11 | 55 | 39 | 23 | 7 |
| Cell 5 | x | 6 | 50 | 34 | 18 | 2 | 46 | 30 | 14 | 58 | 42 | 26 | 10 | 54 | 38 | 22 |
| Cell 6 | x | 53 | 37 | 21 | 5 | 49 | 33 | 17 | 1 | 45 | 29 | 13 | 57 | 41 | 25 | 9 |

Sequence 4 consists of 60 steps, pulsing 2 rows in each step.
Cell 1 and Cell 2 are cleaned twice.

| Pulse Valves Sequence 5 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 23 | 15 | 7 | 29 | 21 | 13 | 5 | 27 | 19 | 11 | 3 | 25 | 17 | 9 | 1 |
| Cell 2 | x | 24 | 16 | 8 | 30 | 22 | 14 | 6 | 28 | 20 | 12 | 4 | 26 | 18 | 10 | 2 |
| Cell 3 | x | 14 | 6 | 28 | 20 | 12 | 4 | 26 | 18 | 10 | 2 | 24 | 16 | 8 | 30 | 22 |
| Cell 4 | x | 13 | 5 | 27 | 19 | 11 | 3 | 25 | 17 | 9 | 1 | 23 | 15 | 7 | 29 | 21 |
| Cell 5 | x | 11 | 3 | 25 | 17 | 9 | 1 | 23 | 15 | 7 | 29 | 21 | 13 | 5 | 27 | 19 |
| Cell 6 | x | 12 | 4 | 26 | 18 | 10 | 2 | 24 | 16 | 8 | 30 | 22 | 14 | 6 | 28 | 20 |

Sequence 5 has 30 steps, pulsing 3 rows in each step.

| Pulse Valves Sequence 6 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 34 | 22 | 10 | 43 | 31 | 19 | 7 | 40 | 28 | 16 | 4 | 37 | 25 | 13 | 1 |
| Cell 2 | x | 34 | 22 | 10 | 43 | 31 | 19 | 7 | 40 | 28 | 16 | 4 | 37 | 25 | 13 | 1 |
| Cell 3 | x | 35 | 23 | 11 | 44 | 32 | 20 | 8 | 41 | 29 | 17 | 5 | 38 | 26 | 14 | 2 |
| Cell 4 | x | 35 | 23 | 11 | 44 | 32 | 20 | 8 | 41 | 29 | 17 | 5 | 38 | 26 | 14 | 2 |
| Cell 5 | x | 36 | 24 | 12 | 45 | 33 | 21 | 9 | 42 | 30 | 18 | 6 | 39 | 27 | 15 | 3 |
| Cell 6 | x | 36 | 24 | 12 | 45 | 33 | 21 | 9 | 42 | 30 | 18 | 6 | 39 | 27 | 15 | 3 |

Sequence 6 has 45 steps, pulsing 2 rows in each step.

| Pulse Valves Sequence 7 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 23 | 15 | 7 | 29 | 21 | 13 | 5 | 27 | 19 | 11 | 3 | 25 | 17 | 9 | 1 |
| Cell 2 | x | 24 | 16 | 8 | 30 | 22 | 14 | 6 | 28 | 20 | 12 | 4 | 26 | 18 | 10 | 2 |
| Cell 3 | x | 24 | 16 | 8 | 30 | 22 | 14 | 6 | 28 | 20 | 12 | 4 | 26 | 18 | 10 | 2 |
| Cell 4 | x | 23 | 15 | 7 | 29 | 21 | 13 | 5 | 27 | 19 | 11 | 3 | 25 | 17 | 9 | 1 |
| Cell 5 | x | 23 | 15 | 7 | 29 | 21 | 13 | 5 | 27 | 19 | 11 | 3 | 25 | 17 | 9 | 1 |
| Cell 6 | x | 24 | 16 | 8 | 30 | 22 | 14 | 6 | 28 | 20 | 12 | 4 | 26 | 18 | 10 | 2 |

Sequence 7 has 30 steps, pulsing 3 rows in each step.

| Pulse Valves Sequence 8 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| | x | | | | | | | | | | | | | | | |
| Cell 1 | x | 12 | 8 | 4 | 15 | 11 | 7 | 3 | 14 | 10 | 6 | 2 | 13 | 9 | 5 | 1 |
| Cell 2 | x | 12 | 8 | 4 | 15 | 11 | 7 | 3 | 14 | 10 | 6 | 2 | 13 | 9 | 5 | 1 |
| Cell 3 | x | 12 | 8 | 4 | 15 | 11 | 7 | 3 | 14 | 10 | 6 | 2 | 13 | 9 | 5 | 1 |

-continued

| Pulse Valves Sequence 8 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Cell 4 | x | 12 | 8 | 4 | 15 | 11 | 7 | 3 | 14 | 10 | 6 | 2 | 13 | 9 | 5 | 1 |
| Cell 5 | x | 12 | 8 | 4 | 15 | 11 | 7 | 3 | 14 | 10 | 6 | 2 | 13 | 9 | 5 | 1 |
| Cell 6 | x | 12 | 8 | 4 | 15 | 11 | 7 | 3 | 14 | 10 | 6 | 2 | 13 | 9 | 5 | 1 |

Sequence 8 has 15 steps, pulsing 6 rows in each step.

| Pulse Valves Sequence 9 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Cell 1 | x | 43 | 34 | 25 | 16 | 7 | 40 | 31 | 22 | 13 | 4 | 37 | 28 | 19 | 10 | 1 |
| Cell 2 | x | 43 | 34 | 25 | 16 | 7 | 40 | 31 | 22 | 13 | 4 | 37 | 28 | 19 | 10 | 1 |
| Cell 3 | x | 44 | 35 | 26 | 17 | 8 | 41 | 32 | 23 | 14 | 5 | 38 | 29 | 20 | 11 | 2 |
| Cell 4 | x | 44 | 35 | 26 | 17 | 8 | 41 | 32 | 23 | 14 | 5 | 38 | 29 | 20 | 11 | 2 |
| Cell 5 | x | 45 | 36 | 27 | 18 | 9 | 42 | 33 | 24 | 15 | 6 | 39 | 30 | 21 | 12 | 3 |
| Cell 6 | x | 45 | 36 | 27 | 18 | 9 | 42 | 33 | 24 | 15 | 6 | 39 | 30 | 21 | 12 | 3 |

Sequence 9 has 45 steps, pulsing 2 rows in each step.

| Pulse Valves Sequence 10 | | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Cell 1 | x | 29 | 23 | 17 | 11 | 5 | 27 | 21 | 15 | 9 | 3 | 25 | 20 | 13 | 7 | 1 |
| Cell 2 | x | 30 | 24 | 18 | 12 | 6 | 28 | 22 | 16 | 10 | 4 | 26 | 19 | 14 | 8 | 2 |
| Cell 3 | x | 30 | 24 | 18 | 12 | 6 | 28 | 22 | 16 | 10 | 4 | 26 | 20 | 14 | 8 | 2 |
| Cell 4 | x | 29 | 23 | 17 | 11 | 5 | 27 | 21 | 15 | 9 | 3 | 25 | 19 | 13 | 7 | 1 |
| Cell 5 | x | 29 | 23 | 17 | 11 | 5 | 27 | 21 | 15 | 9 | 3 | 25 | 19 | 13 | 7 | 1 |
| Cell 6 | x | 30 | 24 | 18 | 12 | 6 | 28 | 22 | 16 | 10 | 4 | 26 | 20 | 14 | 8 | 2 |

Sequence 10 has 30 steps, pulsing 3 rows per step.

The system may clean continuously in online mode at a controlled overall differential pressure, with the dwell time between pulses being continuously adjusted based on sensed differential pressure. The system may include a different pressure instrument, such as a differential pressure transmitter connected to both the inlet and outlet of the fabric filter system to measure the different pressure. If the differential pressure instrument fails, the controller may cause the sequence to pulse continuously at a constant dwell time. In Offline mode, the dwell time may be constant and the sequence may run continuously if the differential pressure instrument fails. After evaluating the various sequences, the controller may dynamically adjust the sequences or select different sequences depending on operating conditions and changes may be made to the control of the air header supply pressure.

The system may contain a switch to allow for changing between online and offline cleaning modes. Changing the position of the online/offline cleaning mode switch may cause a current cleaning sequence to pause for a few seconds while the controller loads a new sequence corresponding to the new cleaning mode, and then resume operation in the new mode at the starting point for the selected sequence.

In the foregoing, the invention has been described with reference to particular embodiments. However, it is evident that various modification and changes may be made thereto without departing from the broader scope of the invention.

The invention claimed is:

1. A filter system comprising:
   a plurality of filter bag cells, each cell comprising a plurality of filter bags;
   at least as many pulse pipes as filter bag cells, each pulse pipe connected to at least one compressed air header;
   a plurality of valves configured to control air flow from the at least one header to the pulse pipes to generate air pulses, wherein the pulse pipes are positioned such that the air pulse from each pipe is directed into at least one filter bag;
   a differential pressure sensor; and
   a controller configured to operate in an online mode, wherein the controller activates the valves in a sequence and adjusts one or more of a plurality of parameters associated with emitted air pulses, wherein the controller is configured to automatically adjust the parameters and the order of activation of each pulse pipe to maintain a consistent differential pressure across the filter system, based on inputs from the pressure sensor.

2. The system of claim 1, where the at least one compressed air header includes a plurality of air headers connected together.

3. The system of claim 1, wherein the parameters include dwell time between pulses, pulse width, and pulse air pressure.

4. The system of claim 1, wherein the plurality of filter bags are arranged in a plurality of rows in a plurality of cells, and wherein the controller is configured to implement continuous cleaning sequences of the plurality of rows of bags.

5. The system of claim 1, wherein the controller is further configured to automatically enter an offline mode if the pressure sensor fails, wherein the cells being pulsed are taken out of service and wherein the dwell time between pulses is constant and the pulse sequence is run continuously.

6. The system of claim 1, further comprising a switch to allow for changing between the online cleaning mode, and an offline cleaning mode, wherein the dwell time between pulses is constant and a preprogrammed cleaning sequence is run continuously.

7. The system of claim 1, wherein the controller is further configured to automatically enter a mode upon abnormal operating conditions, wherein the controller automatically adjusts the parameters to maintain a maximum amount of filter cake on the bags to promote optimal emissions control performance.

8. A method of filtering particulates from air or gas, the method comprising:
providing a plurality of filter bag cells, each cell comprising a plurality of filter bags in a filter system;
providing at least as many pulse pipes as filter bag cells, each pulse pipe connected to at least one compressed air header;
providing a plurality of valves configured to control air flow from the at least one header to the pulse pipes to generate air pulses, wherein the pulse pipes are positioned such that the air pulse from each pipe is directed into at least one filter bag;
receiving from a pressure sensor an indication of differential pressure within the filter system at a controller;
transmitting commands from a controller to activate the valves in an order to generate air pulses based on the received indication of pressure differential; and
automatically adjusting, with the controller, parameters associated with the generated air pulses and the order of activation of each pulse pipe to maintain a consistent differential pressure across the filter system, based on inputs from the pressure sensor, wherein the parameters include dwell time between pulses, pulse width, and pulse air pressure.

9. The method of claim 8, further comprising providing communication interfaces connected to the controller at a plurality of air headers, wherein the communication interfaces receive commands from the controller.

10. The method of claim 8, further comprising providing a plurality of rows of filter bags and implementing a cleaning sequence including a plurality of steps to clean each row of bags, wherein each step in the cleaning sequence corresponds to an opening of one or more valves within the system.

11. The method of claim 10, further comprising setting a differential pressure set point, and automatically adjusting one or more of the parameters when the determined differential pressure rises above or falls below the set point.

12. The method of claim 11, wherein the automatic adjusting step is performed to achieve the minimum cleaning necessary per pulse to achieve a consistent differential pressure, based on the set point.

13. The method of claim 8, further comprising automatically adjusting the parameters to maintain a consistent amount of filter cake on the bags.

14. The method of claim 8, wherein automatically adjusting step further comprises the controller automatically entering a mode upon abnormal operating conditions, wherein the controller automatically adjusts the parameters to maintain a maximum amount of filter cake on the bags to promote optimal emissions control performance.

15. A method of filtering particulates from air or gas, the method comprising:
providing a plurality of filter bag cells, each cell comprising a plurality of filter bags in a filter system;
providing a compressed air header;
providing a pulse pipe connected to the compressed air header;
providing a valve configured to control air flow from the header to the pulse pipe to generate air pulses, wherein the pulse pipe is positioned such that the air pulse from the pipe is directed into at least one filter bag;
receiving from a pressure sensor an indication of differential pressure within the filter system at a controller;
transmitting commands from a controller to activate the valve to generate air pulses based on the received indication of pressure differential; and
automatically adjusting, with the controller, parameters associated with the generated air pulses and the order of activation of each pulse pipe to maintain a consistent differential pressure and to maintain a maximum amount of filter cake on the bags to promote optimal emissions control performance, based on inputs from the pressure sensor, wherein the parameters include dwell time between pulses, pulse width, and pulse air pressure.

* * * * *